US011054525B1

(12) United States Patent
Archer et al.

(10) Patent No.: US 11,054,525 B1
(45) Date of Patent: Jul. 6, 2021

(54) GNSS SIMULATION TO DISRUPT UNMANNED VEHICLE OPERATION

(71) Applicant: Flex Force Enterprises Inc., Portland, OR (US)

(72) Inventors: Cynthia Louise Archer, Sherwood, OR (US); Jacob Ryan Sullivan, Portland, OR (US)

(73) Assignee: Flex Force Enterprises Inc., Portland, OR (US)

( * ) Notice: Subject to any disclaimer, the term of this patent is extended or adjusted under 35 U.S.C. 154(b) by 0 days.

(21) Appl. No.: 16/952,450

(22) Filed: Nov. 19, 2020

(51) Int. Cl.
*G01S 19/01* (2010.01)
*G01S 19/21* (2010.01)
*H04K 3/00* (2006.01)

(52) U.S. Cl.
CPC .......... *G01S 19/015* (2013.01); *G01S 19/215* (2013.01); *H04K 3/90* (2013.01)

(58) Field of Classification Search
CPC ...... G01S 19/015; G01S 19/215; G01S 19/21; G01S 19/03; H04K 3/90; H04K 3/65
USPC .............................................. 342/15, 357.59
See application file for complete search history.

(56) References Cited

U.S. PATENT DOCUMENTS

| | | | | |
|---|---|---|---|---|
| 5,557,284 A * | 9/1996 | Hartman | ............... | G01S 19/215 342/352 |
| 6,396,432 B1 * | 5/2002 | Riemschneider | ........ | H04K 3/90 342/15 |
| 7,623,068 B2 * | 11/2009 | Powell | ..................... | G01S 19/01 342/357.29 |
| 8,531,332 B2 * | 9/2013 | Gum | ..................... | G01S 5/0215 342/357.73 |
| 9,158,001 B2 * | 10/2015 | Ariel | ....................... | G01S 19/11 |
| 9,494,691 B2 * | 11/2016 | Gum | ..................... | G01S 19/215 |
| 10,065,746 B2 * | 9/2018 | Tarimala | ............ | B64D 45/0015 |
| 10,234,564 B2 * | 3/2019 | Whitehead | ............ | G01S 19/215 |
| 10,908,293 B2 * | 2/2021 | Whitehead | ............ | G01S 19/215 |
| 2011/0109506 A1 * | 5/2011 | Humphreys | .......... | G01S 19/215 342/357.68 |
| 2011/0227787 A1 * | 9/2011 | Gum | ..................... | G01S 5/0215 342/357.28 |
| 2013/0127662 A1 * | 5/2013 | Ariel | ....................... | G01S 19/11 342/357.48 |
| 2013/0328719 A1 * | 12/2013 | Gum | ..................... | G01S 5/0215 342/357.73 |

(Continued)

*Primary Examiner* — Erin F Heard
*Assistant Examiner* — Michael W Justice
(74) *Attorney, Agent, or Firm* — The Law Office of Raul D. Martinez, PC

(57) ABSTRACT

Several examples of a navigation disruption device and methods of using the same are described herein that use real-time, low-cost computation to generate conflicting/competing signals to actual Global Navigation Satellite System (GNSS) signals. For example, the novel, hand-held navigation disruption devices described herein (1) generate signals from a simulated satellite constellation, wherein the signals from the simulated satellite constellation conflict/compete with signals from one or more actual satellite constellations, and (2) transmit the signals from the simulated satellite constellation(s) towards an unmanned vehicle. The signals from the simulated satellite constellation(s) cause the unmanned vehicle to compute an incorrect position, which in turn disrupts its ability to navigate and operate effectively.

18 Claims, 4 Drawing Sheets

(56) References Cited

U.S. PATENT DOCUMENTS

| | | | |
|---|---|---|---|
| 2015/0268350 A1* | 9/2015 | Whitehead | G01S 3/46 |
| | | | 342/357.59 |
| 2017/0369183 A1* | 12/2017 | Tarimala | G08G 5/0069 |
| 2018/0208326 A1* | 7/2018 | Sander | H04K 3/84 |
| 2018/0372879 A1* | 12/2018 | Whitehead | G01S 19/55 |
| 2019/0179033 A1* | 6/2019 | Sasaki | H04K 3/228 |
| 2020/0225359 A1* | 7/2020 | Whitehead | G01S 19/215 |
| 2020/0272827 A1* | 8/2020 | Morrow | H04K 3/43 |

* cited by examiner

GNSS SIMULATION TO DISRUPT UNMANNED VEHICLE OPERATION

FIELD

The subject matter described herein relates to generation of simulated navigation signals and more particularly to equipment for disrupting operational capabilities of unmanned vehicles with simulated navigation signals.

BACKGROUND

A satellite navigation system is a system that uses satellites to provide autonomous geo-spatial positioning. For example, a satellite navigation system allows small electronic receivers to determine their location (e.g., longitude, latitude, and altitude/elevation) using radio signals transmitted along a line of sight from satellites that are part of the satellite navigation system. A satellite navigation system can be used for providing position, stabilization, navigation, or for tracking the position of something fitted with a receiver that is compatible with the satellite navigation system (e.g., satellite tracking).

SUMMARY

Several examples of a navigation disruption device and methods of using the same are described herein that use real-time, low-cost computation to generate conflicting/competing signals to actual Global Navigation Satellite System (GNSS) signals. For example, the novel, hand-held navigation disruption devices described herein (1) generate signals from a simulated satellite constellation, wherein the signals from the simulated satellite constellation conflict/compete with signals from one or more actual satellite constellations, and (2) transmit the signals from the simulated satellite constellation towards an unmanned vehicle. The signals from the simulated satellite constellation cause the unmanned vehicle to compute an erroneous position, which in turn disrupts its ability to navigate and operate effectively.

In one example, a navigation disruption device comprises a controller configured to generate signals from a simulated satellite constellation, wherein the signals from the simulated satellite constellation conflict with signals from an actual satellite constellation. The navigation disruption device further comprises a transmitter configured to transmit the signals from the simulated satellite constellation towards an unmanned vehicle.

In some examples, the controller is further configured to determine a position of the navigation disruption device and to estimate a position of the unmanned vehicle based on at least one of the following: the position of the navigation disruption device, a direction of the unmanned vehicle from the navigation disruption device, and an estimated range of the unmanned vehicle from the navigation disruption device.

In some examples, the controller is further configured to select which satellites of the actual satellite constellation to simulate with the simulated satellite constellation, based at least partially on an estimated position of the unmanned vehicle.

In some examples, the navigation disruption device further comprises a user interface configured to receive, from a user, at least one of the following signal generation parameters: signal transmission power, signal transmission duration, a selection of the actual satellite constellation to be simulated with the simulated satellite constellation, a desired positional offset of the unmanned vehicle relative to an actual position of the unmanned vehicle, and a restricted area identified by the user. In some examples, the controller is further configured to generate the signals from the simulated satellite constellation, based at least partially on the received signal generation parameters and constellation data associated with the actual satellite constellation. In some examples, the navigation disruption device further comprises a receiver configured to receive, from the actual satellite constellation, the constellation data. In other examples, the navigation disruption device further comprises a storage device containing the constellation data.

In some examples, the controller is further configured to generate signals from the simulated satellite constellation that prevent the unmanned vehicle from being able to approach a restricted area identified by the user.

In some examples, the navigation disruption device further comprises a battery configured to provide power to the navigation disruption device.

In some examples, the navigation disruption device further comprises a housing configured to house the controller and the transmitter, the housing having a weight and dimensions suitable for a single user to hold and operate the navigation disruption device.

In some examples, the controller is further configured to generate signals from at least one additional simulated satellite constellation.

In another example, a navigation disruption device comprises a controller configured to (1) select which satellites of an actual satellite constellation to simulate with a simulated satellite constellation, based at least partially on an estimated position of an unmanned vehicle, and (2) generate signals from the simulated satellite constellation, wherein the signals from the simulated satellite constellation conflict with signals from the actual satellite constellation. The navigation disruption device further comprises a user interface configured to receive, from a user, at least one of the following signal generation parameters: signal transmission power, signal transmission duration, a selection of the actual satellite constellation to be simulated with the simulated satellite constellation, a desired positional offset of the unmanned vehicle relative to an actual position of the unmanned vehicle, and a restricted area identified by the user. The navigation disruption device also comprises a receiver configured to receive, from the actual satellite constellation, constellation data associated with the actual satellite constellation, the controller further configured to generate the signals from the simulated satellite constellation, based at least partially on the received signal generation parameters and the constellation data. The navigation disruption device additionally comprises a transmitter configured to transmit the signals from the simulated satellite constellation towards the unmanned vehicle and a battery configured to provide power to the navigation disruption device. The navigation disruption device further comprises a housing configured to house the controller, the receiver, the transmitter, and the battery, the housing having a weight and dimensions suitable for a single user to hold and operate the navigation disruption device.

In some examples, the controller is further configured to generate signals from the simulated satellite constellation that prevent the unmanned vehicle from being able to approach a restricted area identified by the user.

In a further example, a method comprises generating, at a navigation disruption device, signals from a simulated satellite constellation, wherein the signals from the simulated satellite constellation conflict with signals from an actual satellite constellation. The method also comprises transmitting the signals from the simulated satellite constellation towards an unmanned vehicle.

In some examples, the method additionally comprises determining a position of the navigation disruption device and estimating a position of the unmanned vehicle based on at least one of the following: the position of the navigation disruption device, a direction of the unmanned vehicle from the navigation disruption device, and an estimated range of the unmanned vehicle from the navigation disruption device.

In some examples, the method further comprises selecting which satellites of the actual satellite constellation to simulate with the simulated satellite constellation, based at least partially on an estimated position of the unmanned vehicle.

In some examples, the method also comprises receiving, from a user, at least one of the following signal generation parameters: signal transmission power, signal transmission duration, a selection of the actual satellite constellation to be simulated with the simulated satellite constellation, a desired positional offset of the unmanned vehicle relative to an actual position of the unmanned vehicle, and a restricted area identified by the user. In further examples, the method additionally comprises generating the signals from the simulated satellite constellation, based at least partially on the received signal generation parameters and constellation data associated with the actual satellite constellation. In still further examples, the method also comprises receiving, from the actual satellite constellation, the constellation data.

In some examples, the method additionally comprises generating signals from the simulated satellite constellation that prevent the unmanned vehicle from being able to approach a restricted area identified by the user.

In some examples, the method further comprises generating signals from at least one additional simulated satellite constellation.

DETAILED DESCRIPTION

Figure 1:
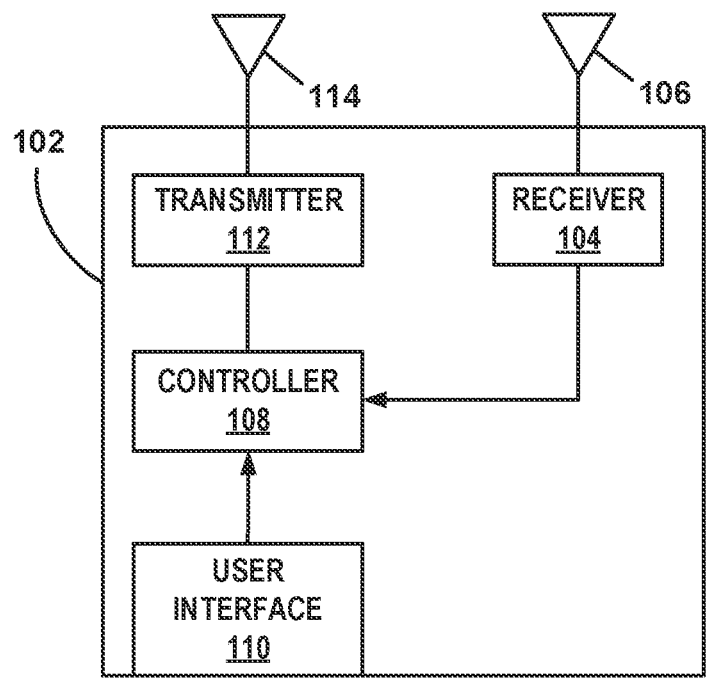
FIG. 1 is a block diagram of an example navigation disruption device that receives constellation data from an actual satellite constellation.

Global Navigation Satellite System (GNSS) is an umbrella term that encompasses all global satellite positioning systems. This includes constellations of satellites orbiting over the Earth's surface and continuously transmitting signals that enable users to determine their position.

The Global Positioning System (GPS) is one example of a Global Navigation Satellite System. Specifically, GPS refers to the NAVSTAR Global Positioning System, a constellation of satellites developed by the United States Department of Defense. Originally, the Global Positioning System was developed for military use but was later made accessible to civilians, as well. GPS is now the most widely used GNSS in the world and provides continuous positioning and timing information globally, under any weather conditions.

Besides GPS, there are other satellite navigation systems, such as Russia's Global Navigation Satellite System (GLONASS), China's BeiDou Navigation Satellite System (BDS), and the European Union's Galileo. Japan's Quasi-Zenith Satellite System (QZSS) is a GPS satellite-based augmentation system to enhance GPS's accuracy, with satellite navigation independent of GPS scheduled for 2023. India has the Indian Regional Navigation Satellite System (IRNSS), also known as Navigation with Indian Constellation (NAVIC), an autonomous regional satellite navigation system that provides accurate real-time positioning and timing services, with plans to expand to a global version in the long-term.

Global coverage for each system is generally achieved by a satellite constellation of 18-30 medium Earth orbit (MEO) satellites spread between several orbital planes. The actual systems vary, but each system uses orbital inclinations of >50° and orbital periods of roughly twelve hours (at an altitude of about 20,000 kilometers or 12,000 miles).

GPS systems can work in conjunction with other GNSS systems to provide precise location positioning anywhere on Earth. However, the main difference between GPS and other, non-GPS GNSS systems is that GNSS-compatible equipment can use signals from navigational satellites from other networks beyond the GPS system. Thus, GNSS-compatible systems can utilize signals from a greater number of satellites, which means increased receiver accuracy and reliability. Although GNSS-compatible receivers are compatible with GPS, GPS receivers are not necessarily compatible with other GNSS systems. As used herein, the terms "GPS" and "GNSS" are generally considered interchangeable, unless expressly indicated otherwise.

Both GPS and GNSS systems comprise three major segments: the space segment (e.g., satellites), the ground segment (e.g., ground control stations), and the user segment (e.g., GNSS or GPS receivers). In both types of systems, the exact location of each satellite is known at any given moment since the satellites are continuously sending radio signals toward Earth, which are picked up by GNSS or GPS receivers. The ground control stations that monitor the Global Navigation Satellite System continuously track the satellites, update the positions of each satellite, and enable information on Earth to be transmitted to the satellites. In some cases, the ground control stations of a particular GNSS provide access, via a network, to the current position/timing information for each of the satellites of the GNSS so users can calibrate/update their GNSS receivers.

GNSS and GPS receivers are employed in a variety of fields where the use of precise, continually available position and time information is required, including agriculture, transportation, machine control, marine navigation, vehicle navigation, mobile communication, and athletics. However, not all uses of GNSS/GPS are benign.

For example, the recent increase in the availability and use of unmanned aerial vehicles (UAVs), drones, and remote controlled model aircraft, which may utilize GNSS/GPS for navigation purposes, raises safety and security concerns, both for civilians and the Department of Defense (DoD). These recreational aircraft can be co-opted for malicious intent by terrorists and criminals. A UAV can be used, either intentionally or through ignorance, to impede the efforts of first responders in emergency situations. They can also be used to threaten the safety of civilians, especially at large social gatherings (e.g. Olympics), by terrorist organizations.

Consequently, law enforcement and security organizations need tools to prohibit unauthorized UAVs from entering/approaching restricted areas. More specifically, there is a need to disable/disrupt unmanned vehicles (e.g. airborne drones), which are operated with nefarious intent, to safeguard civilians, warfighters, and critical infrastructure.

This need to counteract the threat posed by UAVs has driven the development of navigation disruption systems in one of two directions. The first type of navigation disruption system includes hand-held jammers that are designed to disrupt (1) command signals from the controller to the UAV, (2) telemetry and video signals from the UAV to the controller, and/or (3) navigation signals from overhead satellites. Some of these hand-held jammers operate by flooding the command and navigation frequency bands with either random or structured noise, overwhelming the UAV's receivers, so that the command and/or navigation signals are buried in the noise so the UAV cannot detect the true satellite navigation signals. With loss of operator control and/or navigation, the UAV then resorts to default behavior, such as landing, hovering, or returning to its base.

The second type of navigation disruption system utilizes GPS signal replacement, the goal of which is to take control of a UAV by broadcasting false GPS signals configured to interfere with the UAV's navigation. These systems use computationally expensive methods to generate convincing pirate signals that are then used to capture and control navigation of the target vehicle. These pirating methods are typically the providence of state operators and are usually tightly restricted. In these pirate systems, the false GPS signal is matched to the true signals from the GPS satellites. By providing a stronger GPS signal to the UAV, the jamming system tricks the UAV's signal tracking loops to lock onto the set of false GPS signals. The navigation signals are then manipulated to allow a pirate operator to gain operational control of the UAV. These pirate systems generally require large scale laboratory equipment to effectively capture and retain remote control of the UAV.

The examples described herein use real-time, low cost computation to generate a conflicting/competing signal to the actual GNSS signals. More specifically, the examples discussed below are generally directed to a novel, hand-held navigation disruption device that (1) generates signals from a simulated satellite constellation, wherein the signals from the simulated satellite constellation conflict/compete with signals from an actual satellite constellation, and (2) transmits the signals from the simulated satellite constellation towards an unmanned vehicle using a directional antenna. In other examples, the signals from the simulated satellite constellation may be configured to capture and control navigation of the target vehicle, as described above. The devices described herein can also operate without Internet connectivity or external power supplies, in some cases.

In describing the examples below, the terms "signals from a simulated satellite constellation" and "jamming signals" are used interchangeably. The term "navigation disruption", refers to disturbing any operation of the unmanned vehicle that depends on the GNSS signal, not just its self-position estimation. For instance, the unmanned vehicle may use time from the GNSS signal, and disrupting its sense of time could interfere with operation as severely as disrupting its sense of position. Moreover, the term "unmanned vehicle" can refer to any unmanned vehicle. For example, an unmanned vehicle could be an unmanned aerial vehicle (UAV) or unmanned aerial system (UAS) such as a drone, an airplane, or a rotorcraft; an unmanned land-based vehicle such as a car, truck, tank, or armored vehicle; an unmanned watercraft such as a boat or riverine craft; and an unmanned amphibious vehicle.

The receiver of the unmanned vehicle receives the signals from the simulated satellite constellation, which were transmitted by the navigation disruption device. The signals from the simulated satellite constellation present a self-consistent position that contradicts the live sky signals transmitted from the actual satellite constellation, which causes the unmanned vehicle to compute an incorrect position, which in turn disrupts its ability to operate effectively. More specifically, the presence of a false signal (e.g., signals from the simulated satellite constellation) in concert with the true signal (e.g., signals from the actual satellite constellation) is known to have various effects.

One effect is that the unmanned vehicle receiver locks onto both signals and computes a noisy position estimate that is some combination of the true position of the unmanned vehicle and a position indicated by the false signal. Similarly, in instances where the unmanned vehicle has two receivers, each locked onto a different satellite constellation (e.g., GPS and GLONASS), and the disruption device confuses one of the receivers (e.g., GPS) by utilizing the signals from the simulated GPS satellite constellation, the unmanned vehicle receiver locks onto both the false GPS signal and the true alternate GNSS constellation signal and computes a noisy position estimate that is some combination of the true position of the unmanned vehicle and a position indicated by the false GPS signal.

Another effect is the typical jamming response, wherein the unmanned vehicle loses confidence in all signals and reports loss of navigation signal, which causes the unmanned vehicle to operate in a GPS-denied mode. A third effect is that the unmanned vehicle receiver drops the true signal and locks onto the false signal, giving the navigation disruption device control of the unmanned vehicle's sense of position.

All of these effects are useful outcomes which disrupt the unmanned vehicle's ability to operate effectively. In this manner, the navigation disruption device disrupts the operational capability of hostile/undesired unmanned vehicles.

Although the different examples of navigation disruption devices and methods of using the navigation disruption devices may be described separately, any of the features of any of the examples may be added to, omitted from, or combined with any other example.

FIG. 1 is a block diagram of an example navigation disruption device that receives constellation data from an actual satellite constellation. Navigation disruption device 102 comprises receiver 104, user interface 110, controller 108, and transmitter 112. Although controller 108 and transmitter 112 are described below as separate components, controller 108 and transmitter 112 may be integrated within a single component, such as a software defined radio (SDR), in other examples.

In operation, controller 108 generates signals from a simulated satellite constellation, wherein the signals from the simulated satellite constellation conflict with signals from an actual satellite constellation, and transmitter 112 transmits the signals from the simulated satellite constellation towards an unmanned vehicle to disrupt the navigational capabilities of the unmanned vehicle. The various details and modifications are discussed more fully below.

In the example shown in FIG. 1, receiver 104 is a GNSS receiver configured to receive, via antenna 106, GNSS signals from one or more actual satellite constellations. For the example of FIG. 1, receiver 104 is configured to receive at least GPS signals from the GPS satellite constellation. However, receiver 104 may be configured to receive signals from any one or more GNSS satellite constellations, in other examples.

Receiver 104 is also configured to extract, from the received GNSS signals, constellation data associated with the one or more actual satellite constellations. In other examples, controller 108 or a separate processor are utilized to extract the constellation data from the received GNSS signals. As shown in FIG. 1, the extracted constellation data is provided to controller 108, via shared memory or either a serial link or parallel bus, to use in generating the simulated satellite signals, which is discussed more fully below.

In the example shown in FIG. 1, user interface 110 is an interface by which a user of navigation disruption device 102 can (1) obtain information regarding the status of navigation disruption device 102, (2) detect the presence of an unmanned vehicle within the effective range of navigation disruption device 102, and (3) enter commands, instructions, and/or selections pertaining to the operation of navigation disruption device 102. For example, regarding the status of navigation disruption device 102, user interface 110 may be configured to display information indicating (1) the remaining charge of a battery located within, or connected to, navigation disruption device 102, (2) the current operating mode of navigation disruption device 102, and/or (3) whether navigation disruption device 102 is currently transmitting jamming signals.

Regarding detection of an unmanned vehicle, user interface 110 may, in some examples, be configured to display information indicating the presence, strength, type, and/or direction of detected radio signals associated with operation of an unmanned vehicle. In still further examples, user interface 110 may be configured to display information indicating an estimated range and/or direction of the unmanned vehicle from navigation disruption device 102.

Regarding entry of user commands/selections, user interface 110 may be configured, in some examples, to receive from a user one or more of the following signal generation parameters: signal transmission power, signal transmission duration, a selection of the actual satellite constellation to be simulated with a simulated satellite constellation, a desired positional offset of the unmanned vehicle relative to an actual position of the unmanned vehicle, and a restricted area identified by the user. In certain examples, the signal transmission duration is either "continuous" transmission of the jamming signal or only when a user activates transmission (e.g., by pressing a button/trigger on navigation disruption device 102).

In further examples, selection of the actual satellite constellation to be simulated involves the user selecting one or more actual satellite constellations to simulate. As discussed above, the actual satellite constellation(s) to be simulated can be any suitable GNSS (e.g., GPS, GLONASS, BDS, Galileo, QZSS, and IRNSS/NAVIC). Based on which actual satellite constellation is selected by the user, receiver 104 is configured to receive constellation data from the one or more selected actual satellite constellations, in the example of FIG. 1.

In other examples, the desired positional offset of the unmanned vehicle can include a desired distance and/or direction of the unmanned vehicle relative to the actual position of the unmanned vehicle. For example, a user could select, via user interface 110, that the navigation disruption device 102 transmit signals to an unmanned vehicle to make the unmanned vehicle believe it was located a specified distance (e.g., 50 meters) and/or direction (e.g., south) away from the actual position of the unmanned vehicle.

In still other examples, the user may identify, via user interface 110, a restricted area. The restricted area may be identified in any suitable manner. For example, the restricted area may be identified by GPS coordinates or by sector identifiers/grid coordinates on a pre-programmed map that is accessible by controller 108 of navigation disruption device 102. Based on the identified restricted area, controller 108 of navigation disruption device 102 will generate signals from a simulated satellite constellation that, when transmitted to an unmanned vehicle, will prevent the unmanned vehicle from approaching and/or entering the restricted area identified by the user. In some examples, controller 108 may be further configured to generate signals from a simulated satellite constellation that will fool the receiver of the unmanned vehicle into thinking that the unmanned vehicle is moving in a different direction than it actually is.

User interface 110 may also be configured to receive, from a user, a selection of one or more types of jamming to be utilized to disrupt operation of the unmanned vehicle. For example, the user may select one or more of the following types of jamming: jamming via GNSS simulation, jamming via noise, and jamming the command and control (C2) link of the unmanned vehicle.

As shown in FIG. 1, user interface 110 provides the one or more selected signal generation parameters, using shared memory or a communication link, to controller 108 to be used in generating the simulated satellite signals, which is discussed more fully below.

Based at least partially on the signal generation parameters received via user interface 110 and the constellation data associated with the one or more selected actual satellite constellations, controller 108 generates signals from a simulated satellite constellation. Before generating signals from the simulated satellite constellation, controller 108 may, in some examples, determine the position (e.g., GPS coordinates) of navigation disruption device 102 using the constellation data received from the actual satellite constellation.

Controller 108 may also estimate a position of the unmanned vehicle based on at least one of the following: the position of navigation disruption device 102, a direction of the unmanned vehicle from navigation disruption device 102, and an estimated range of the unmanned vehicle from navigation disruption device 102. Various components may be included in navigation disruption device 102 to provide the information required for controller 108 to estimate the position of the unmanned vehicle. For example, receiver 104 can provide the position of navigation disruption device 102, a compass can provide a direction of the unmanned vehicle from navigation disruption device 102, and a range finder can provide an estimated range of the unmanned vehicle from navigation disruption device 102. In other examples, a user may enter, via user interface 110, estimates for any of the parameters that are used by controller 108 in estimating a position of the unmanned vehicle.

In some examples, controller 108 selects which satellites of the actual satellite constellation to simulate with the simulated satellite constellation, based at least partially on the estimated position of the unmanned vehicle. For example, a GPS receiver requires line-of-sight with a minimum of four GPS satellites to accurately determine its position. However, it is more likely that a GPS receiver would have line-of-sight with between six and eight GPS satellites, at any given time.

Thus, controller 108 determines which satellites of the actual GPS satellite constellation that the unmanned vehicle should be able to "see" via line-of-sight, based on the estimated position of the unmanned vehicle. More specifically, controller 108 selects a subset (e.g., approximately 4-8 GPS satellites) of the entire actual GPS satellite constellation that the unmanned vehicle should be able to "see" as the satellites to simulate with the simulated satellite constellation. For example, if an unmanned vehicle should only be able to "see" (e.g., receive GPS signals from) five of the satellites of the actual GPS satellite constellation, based on the estimated position of the unmanned vehicle, then controller 108 will select the five satellites of the actual GPS satellite constellation from which the unmanned vehicle should be able to receive GPS signals as the satellites to simulate with the simulated satellite constellation.

Controller 108 generates realistic signals from a simulated GPS satellite constellation that is meant to simulate the satellites that were selected from the actual GPS satellite constellation. In some examples, the signals generated by controller 108 are baseband signals from the simulated GPS satellite constellation, which controller 108 transfers to transmitter 112. As described above, the signals from the simulated GPS satellite constellation conflict with signals from the actual GPS satellite constellation.

In other examples, controller 108 may be configured to generate signals from at least one additional simulated satellite constellation. For example, controller 108 may generate signals from a simulated GPS satellite constellation and signals from one or more additional simulated satellite constellations. In some cases, a user may select, via user interface 110, the additional satellite constellation(s) to be simulated. In other cases, controller 108 may select the additional satellite constellation(s) to simulate, based on an estimated position of the unmanned vehicle and which satellites of the additional satellite constellation(s) can be "seen" by the unmanned vehicle at its estimated position.

Regardless of the exact composition of the signals from the simulated satellite constellation(s), transmitter 112 converts the signals received from controller 108 to the appropriate GNSS radio frequency band and amplifies the signals, as necessary, before transmission. Transmitter 112 transmits, via antenna 114, the signals from the simulated satellite constellation(s) towards an unmanned vehicle to disrupt the navigational capabilities of the unmanned vehicle. In some examples, antenna 114 is a wide-band antenna with gain optimized for the GNSS frequency bands.

In generating the signals from the simulated satellite constellation, controller 108 generates signals that are realistic enough to fool the receiver of the unmanned vehicle and/or a simple navigation system (e.g. one without spoofing detection). Thus, although the signals from the simulated satellite constellation do not have the complexity required to capture the navigation system of the unmanned vehicle without detection, the signals from the simulated satellite constellation can still effectively disrupt operation of an unmanned vehicle.

Because the systems described herein do not hide their presence, they do not require the large, power-intensive and expensive compute infrastructure, the sensor suite needed to estimate target position, or the sophisticated (and often classified) algorithms needed for navigation pirating. This is especially important for hand-held systems, which must keep processing units small, lightweight, and low power.

Although the signals from the simulated satellite constellation should be realistic enough to fool the receiver of the unmanned vehicle, the signals from the simulated satellite constellation should also conflict with (e.g., be sufficiently different from) the signals from the actual satellite constellation to be effective. With sufficient transmitted signal strength, the navigation disruption devices described herein can not only cause loss of position lock but can also fool the receiver of the unmanned vehicle into thinking that the unmanned vehicle is moving in a different direction than it actually is. As described above, this capability advantageously allows a user to encourage an unmanned vehicle to move away from and/or be prevented from entering a restricted area without (1) matching the simulated signals to the unmanned vehicle location, (2) capturing the navigation system of the unmanned vehicle, or (3) controlling the unmanned vehicle remotely.

Figure 2:
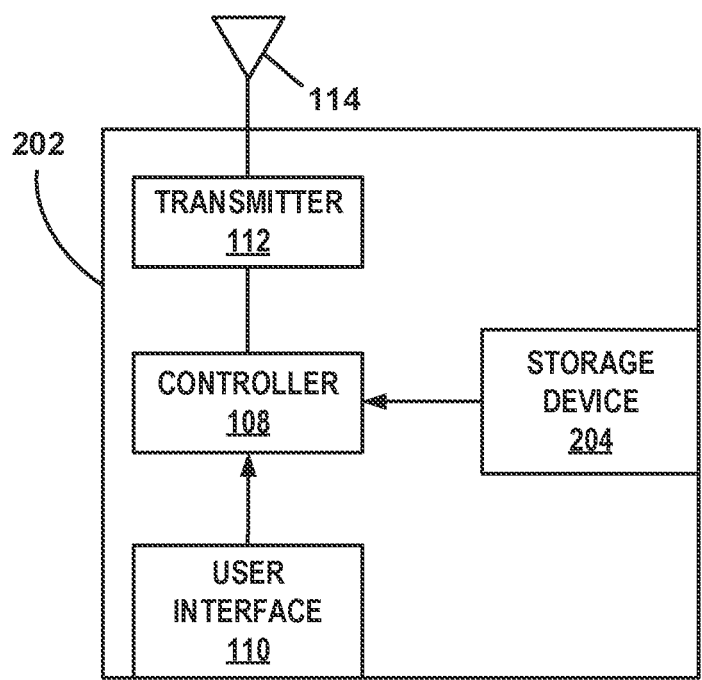
FIG. 2 is a block diagram of an example navigation disruption device that has a storage device containing constellation data associated with an actual satellite constellation.

FIG. 2 is a block diagram of an example navigation disruption device that has a storage device containing constellation data associated with an actual satellite constellation. Navigation disruption device 202 of FIG. 2 is similar in structure and function to navigation disruption device 102 of FIG. 1, except that navigation disruption device 202 has a storage device containing constellation data associated with an actual satellite constellation rather than a receiver to receive constellation data from an actual satellite constellation. More specifically, navigation disruption device 202 comprises storage device 204, user interface 110, controller 108, transmitter 112, and antenna 114. Although navigation disruption device 102 and navigation disruption device 202 are shown separately in FIGS. 1 and 2, other examples may include a single navigation disruption device that has both receiver 104 and storage device 204.

In the example shown in FIG. 2, constellation data from one or more actual satellite constellations is stored on storage device 204. The constellation data is loaded onto storage device 204 from an external data source using a wired or wireless serial communication link or a wired parallel bus, for example. In some examples, storage device 204 may be fixed in navigation disruption device 202, and the constellation data is loaded through an external connection prior to use. In other examples, storage device 204 may be removable such that the constellation data may be loaded onto storage device 204 by another device prior to insertion of storage device 204 into navigation disruption device 202. Regardless of whether storage device 204 is fixed or removable, storage device 204 provides the constellation data to controller 108 via shared memory or either a serial link or parallel bus.

Similar to the discussion above in connection with FIG. 1, controller 108 of navigation disruption device 202 generates signals from one or more simulated satellite constellations, based at least partially on the signal generation parameters received via user interface 110 and the constellation data associated with the one or more actual satellite constellations that are to be simulated. Transmitter 112 transmits, via antenna 114, the signals from the simulated satellite constellation(s) towards an unmanned vehicle to disrupt the navigational capabilities of the unmanned vehicle.

Figure 3:
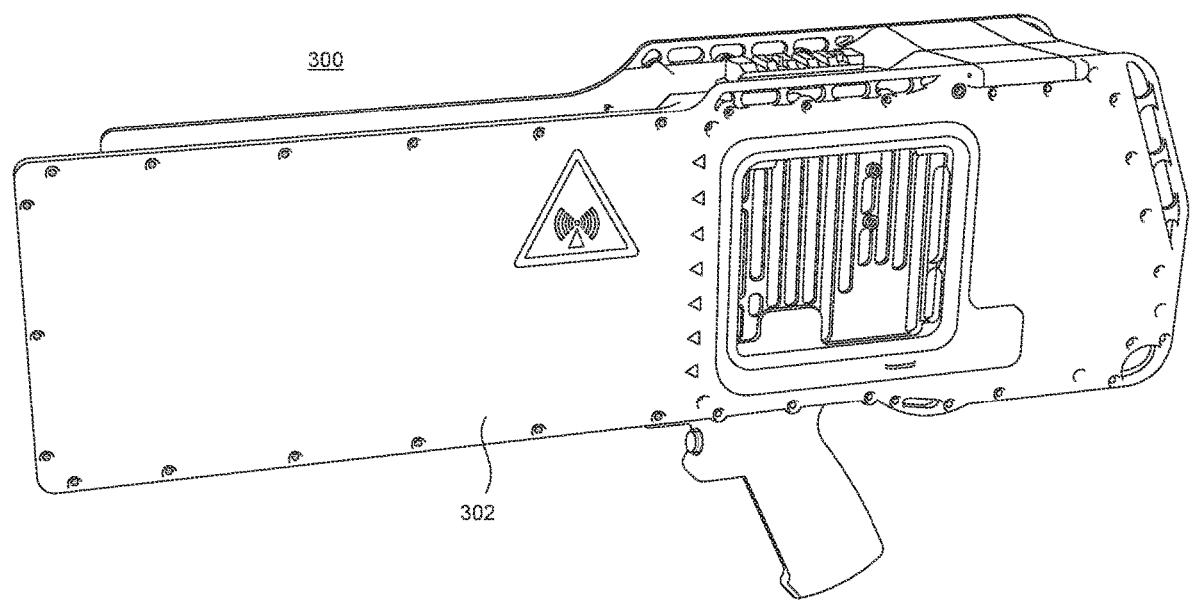
FIG. 3 is a side-view schematic illustration of an example navigation disruption device having a housing that is suitable for a single user to hold and operate the navigation disruption device.

FIG. 3 is a side-view schematic illustration of an example navigation disruption device having a housing that is suitable for a single user to hold and operate the navigation disruption device. For example, navigation disruption device 300 includes housing 302, which is configured to house controller 108 and transmitter 112. Housing 302 has a weight and dimensions suitable for a single user to hold and operate navigation disruption device 300. In some examples, housing 302 also includes mounting points for a grip and/or sling to make navigation disruption device 300 easy to handle and aim.

Figure 4:
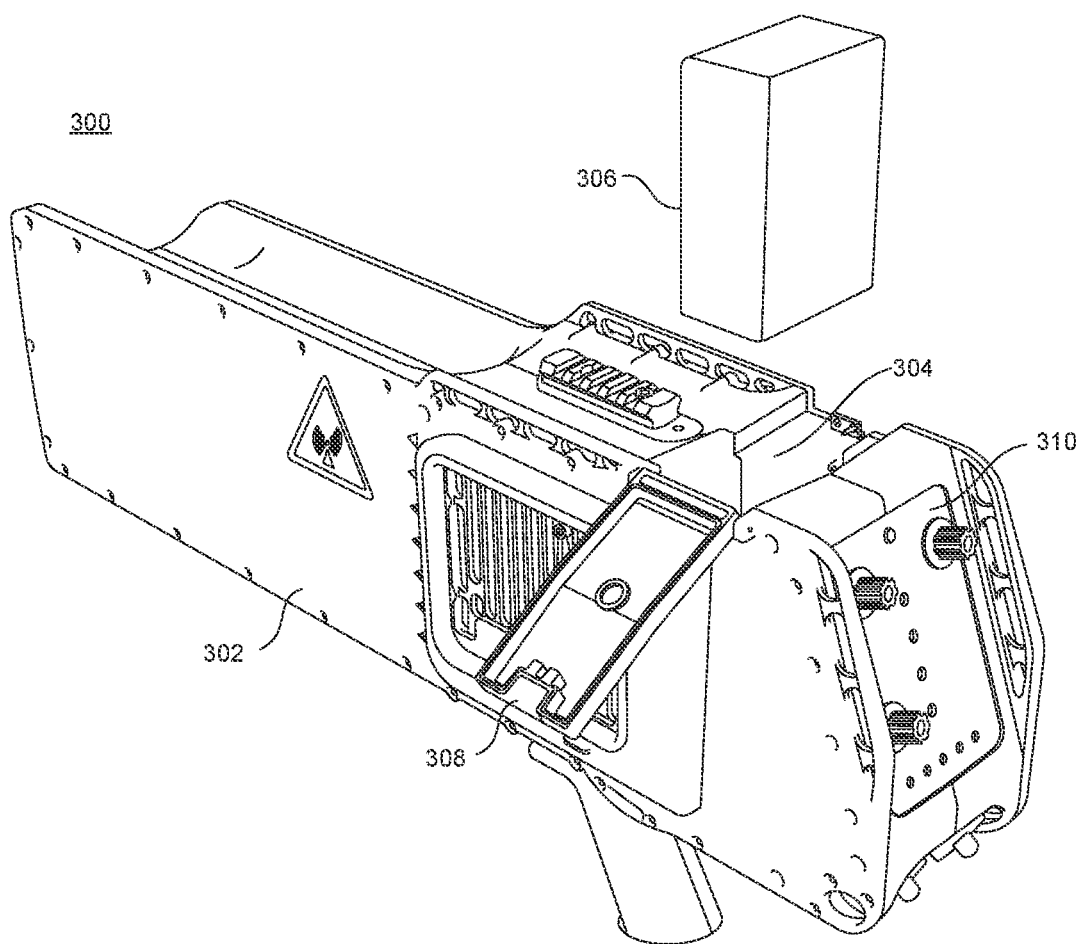
FIG. 4 is a perspective-view schematic illustration of an example navigation disruption device having a battery configured to provide power to the navigation disruption device.

FIG. 4 is a perspective-view schematic illustration of a navigation disruption device having a battery configured to provide power to the navigation disruption device. More specifically, FIG. 4 shows navigation disruption device 300, which includes battery compartment 304 and battery compartment door 308. In FIG. 4, battery compartment door 308 is in an open position. Battery compartment 304 is configured to receive battery 306, which can be any battery suitable to provide power to navigation disruption device 300. In other examples, power may be provided to navigation disruption device 300 through a plug connected to an external power supply, such as a vehicle power source.

FIG. 4 also shows an example of user interface 310, which is similar to user interface 110. User interface 310 can be utilized to (1) obtain information regarding the status of navigation disruption device 300, (2) detect the presence of an unmanned vehicle within the effective range of navigation disruption device 300, and/or (3) enter commands, instructions, and/or selections pertaining to the operation of navigation disruption device 300, in some examples.

Figure 5:
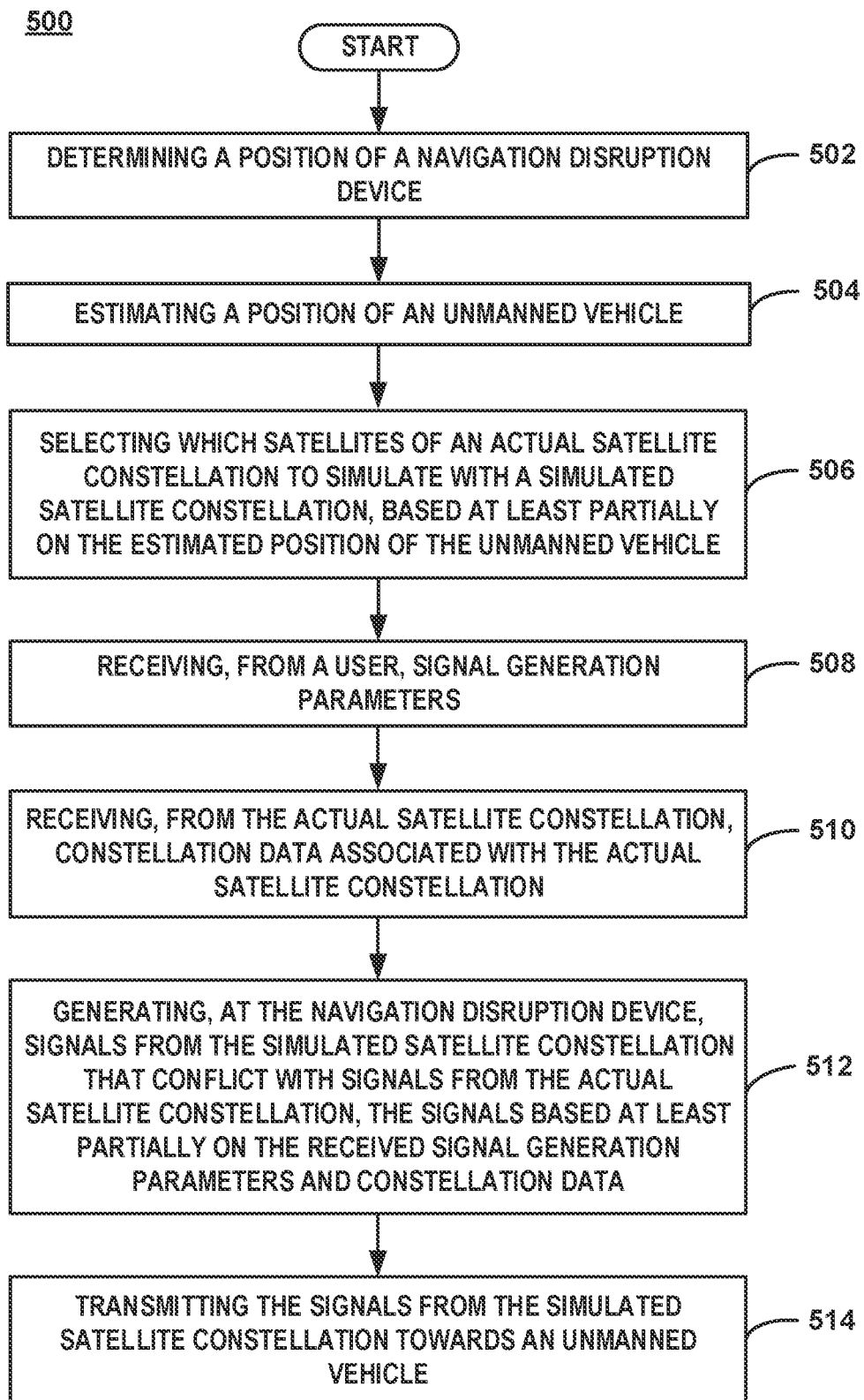
FIG. 5 is a flowchart of an example of a method in which a navigation disruption device generates signals from a simulated satellite constellation and transmits the signals towards an unmanned vehicle.

FIG. 5 is a flowchart of an example of a method in which a navigation disruption device generates signals from a simulated satellite constellation and transmits the signals towards an unmanned vehicle. The method 500 begins at step 502 with determining a position of a navigation disruption device. At step 504, the position of an unmanned vehicle is estimated. At step 506, the navigation disruption device selects which satellites of an actual satellite constellation to simulate with a simulated satellite constellation, based at least partially on the estimated position of the unmanned vehicle. At step 508, the navigation disruption device receives signal generation parameters from a user. At step 510, the navigation disruption device receives, from an actual satellite constellation, constellation data associated with the actual satellite constellation. At step 512, the navigation disruption device generates signals from the simulated satellite constellation that conflict with signals from the actual satellite constellation. The generated signals are based, at least partially, on the received signal generation parameters and constellation data. Although not explicitly shown in FIG. 5, the method 500 may further include generating signals from the simulated satellite constellation that prevent the unmanned vehicle from being able to approach a restricted area identified by the user, in some examples. Similarly, in other examples, method 500 may also include generating signals from at least one additional simulated satellite constellation. At step 514, the navigation disruption device transmits the signals from the simulated satellite constellation(s) towards an unmanned vehicle.

In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5. Similarly, any of the features of any of the methods described herein may be performed in parallel or performed in a different manner/order than that described or shown herein.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A hand-held navigation disruption device comprising:
a controller configured to:
  select one or more satellites of an actual satellite constellation to simulate, based at least partially on an estimated position of an unmanned vehicle, and
  generate a first set of simulated signals that correspond with the selected one or more satellites, wherein the first set of simulated signals comprise Global Navigation Satellite System (GNSS) positioning or timing information that is different than GNSS positioning or timing information contained in a first set of signals transmitted from the actual satellite constellation;
a transmitter configured to transmit the first set of simulated signals towards the unmanned vehicle; and
a housing configured to house the controller and the transmitter, the housing having a weight and dimensions suitable for a single user to hold and operate the hand-held navigation disruption device.

2. The hand-held navigation disruption device of claim 1, wherein the controller is further configured to:
determine a position of the hand-held navigation disruption device; and
estimate a position of the unmanned vehicle based on at least one of the following: the position of the hand-held navigation disruption device, a direction of the unmanned vehicle from the hand-held navigation disruption device, and an estimated range of the unmanned vehicle from the hand-held navigation disruption device.

3. The hand-held navigation disruption device of claim 1, further comprising:
a user interface configured to receive, from a user, at least one of the following signal generation parameters: signal transmission power, signal transmission duration, a selection of the actual satellite constellation to be simulated, a desired positional offset of the unmanned vehicle relative to an actual position of the unmanned vehicle, and a restricted area identified by the user.

4. The hand-held navigation disruption device of claim 3, wherein the controller is further configured to generate the first set of simulated signals, based at least partially on the received signal generation parameters and constellation data associated with the actual satellite constellation.

5. The hand-held navigation disruption device of claim 4, further comprising:
a receiver configured to receive, from the actual satellite constellation, the constellation data.

6. The hand-held navigation disruption device of claim 4, further comprising:
a storage device containing the constellation data.

7. The hand-held navigation disruption device of claim 1, wherein the controller is further configured to generate simulated signals that prevent the unmanned vehicle from being able to approach a restricted area identified by the user.

8. The hand-held navigation disruption device of claim 1, further comprising:
a battery configured to provide power to the hand-held navigation disruption device.

9. The hand-held navigation disruption device of claim 1, wherein the controller is further configured to generate a second set of simulated signals, wherein the second set of simulated signals correspond with one or more selected satellites of a second actual satellite constellation and comprise GNSS positioning or timing information that is different than GNSS positioning or timing information contained in a second set of signals transmitted from the second actual satellite constellation.

10. A hand-held navigation disruption device comprising:
a controller configured to:
  select one or more satellites of an actual satellite constellation to simulate, based at least partially on an estimated position of an unmanned vehicle, and
  generate a first set of simulated signals that correspond with the selected one or more satellites, wherein the first set of simulated signals comprise Global Navigation Satellite System (GNSS) positioning or timing information that is different than GNSS positioning or timing information contained in a first set of signals transmitted from the actual satellite constellation;
a user interface configured to receive, from a user, at least one of the following signal generation parameters: signal transmission power, signal transmission duration, a selection of the actual satellite constellation to be simulated, a desired positional offset of the unmanned vehicle relative to an actual position of the unmanned vehicle, and a restricted area identified by the user;
a receiver configured to receive, from the actual satellite constellation, constellation data associated with the actual satellite constellation, the controller further configured to generate the first set of simulated signals, based at least partially on the received signal generation parameters and the constellation data;
a transmitter configured to transmit the first set of simulated signals towards the unmanned vehicle;
a battery configured to provide power to the hand-held navigation disruption device; and
a housing configured to house the controller, the receiver, the transmitter, and the battery, the housing having a weight and dimensions suitable for a single user to hold and operate the hand-held navigation disruption device.

11. The hand-held navigation disruption device of claim 10, wherein the controller is further configured to generate simulated signals that prevent the unmanned vehicle from being able to approach a restricted area identified by the user.

12. A method comprising:
selecting, at a hand-held navigation disruption device, one or more satellites of an actual satellite constellation to simulate, based at least partially on an estimated position of an unmanned vehicle;
generating, at the hand-held navigation disruption device, a first set of simulated signals that correspond with the selected one or more satellites, wherein the first set of simulated signals comprise Global Navigation Satellite System (GNSS) positioning or timing information that is different than GNSS positioning or timing information contained in a first set of signals transmitted from the actual satellite constellation; and
transmitting, from the hand-held navigation disruption device, the first set of simulated signals towards the unmanned vehicle.

13. The method of claim 12, further comprising:
determining a position of the hand-held navigation disruption device;
estimating a position of the unmanned vehicle based on at least one of the following: the position of the hand-held navigation disruption device, a direction of the unmanned vehicle from the hand-held navigation disruption device, and an estimated range of the unmanned vehicle from the hand-held navigation disruption device.

14. The method of claim 12, further comprising:
receiving, from a user, at least one of the following signal generation parameters: signal transmission power, signal transmission duration, a selection of the actual satellite constellation to be simulated, a desired positional offset of the unmanned vehicle relative to an actual position of the unmanned vehicle, and a restricted area identified by the user.

15. The method of claim 14, further comprising:
generating the first set of simulated signals, based at least partially on the received signal generation parameters and constellation data associated with the actual satellite constellation.

16. The method of claim 15, further comprising:
receiving, from the actual satellite constellation, the constellation data.

17. The method of claim 12, further comprises:
generating simulated signals that prevent the unmanned vehicle from being able to approach a restricted area identified by the user.

18. The method of claim 12, further comprising:
generating a second set of simulated signals, wherein the second set of simulated signals correspond with one or more selected satellites of a second actual satellite constellation and comprise GNSS positioning or timing information that is different than GNSS positioning or timing information contained in a second set of signals transmitted from the second actual satellite constellation.

\* \* \* \* \*